(12) United States Patent
Christensen

(10) Patent No.: US 8,738,098 B2
(45) Date of Patent: May 27, 2014

(54) DEVICES AND ASSOCIATED HINGE MECHANISMS

(75) Inventor: Claus Allan Christensen, København S (DK)

(73) Assignee: Nokia Corporation, Espoo (FI)

( * ) Notice: Subject to any disclaimer, the term of this patent is extended or adjusted under 35 U.S.C. 154(b) by 1362 days.

(21) Appl. No.: 12/514,687

(22) PCT Filed: Nov. 14, 2006

(86) PCT No.: PCT/EP2006/010940
§ 371 (c)(1),
(2), (4) Date: May 18, 2010

(87) PCT Pub. No.: WO2008/058555
PCT Pub. Date: May 22, 2008

(65) Prior Publication Data
US 2010/0225577 A1    Sep. 9, 2010

(51) Int. Cl.
*H04M 1/00* (2006.01)
(52) U.S. Cl.
USPC ..................................... 455/575.1
(58) Field of Classification Search
CPC ........ H04M 1/00; H04M 1/0214; H04W 8/02
USPC ............... 455/550.1, 575.3, 575.1, 90.3, 566, 455/574, 575.5, 556.1; 345/156; 361/679.01; 414/405
See application file for complete search history.

(56) References Cited

U.S. PATENT DOCUMENTS

| | | | |
|---|---|---|---|
| 2005/0107138 A1* | 5/2005 | SanGiovanni | 455/575.1 |
| 2005/0107142 A1 | 5/2005 | Soejima | |
| 2006/0230580 A1* | 10/2006 | Watanabe et al. | 16/367 |

FOREIGN PATENT DOCUMENTS

| | | |
|---|---|---|
| CN | 1489361 | 4/2004 |
| EP | 1298890 | 4/2003 |
| WO | 2005069588 | 7/2005 |
| WO | 2006009574 | 1/2006 |

OTHER PUBLICATIONS

International Search Report and Written Opinion received in corresponding Patent Cooperation Treaty Application No. PCT/EP2006/010940, Jul. 27, 2007, 13 pages.
Office Action received in corresponding Chinese Application No. 200680056133.4, Feb. 14, 2011, 16 pages.

* cited by examiner

*Primary Examiner* — Kiet Doan
(74) *Attorney, Agent, or Firm* — Harrington & Smith

(57) ABSTRACT

A device comprising first and second housings arranged to swivel about a swivel axis, wherein the device is arranged such that relative turning of the first and second housings about the swivel axis in a first direction reveals a first device user operational area, and relative turning of the first and second housings in the second opposing direction reveals a second device user operational area.

15 Claims, 4 Drawing Sheets

Open Swivel with right hand for normal keypad
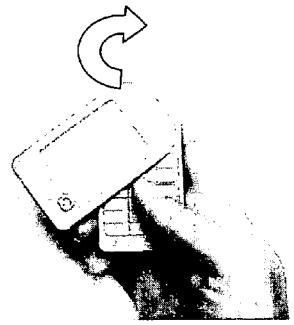
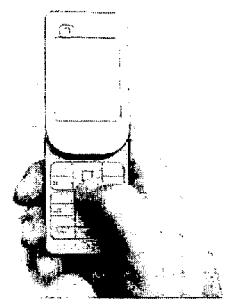
Figure 2a
Figure 2b
Open Swivel with left hand for handwriting input (pen is held by right hand)
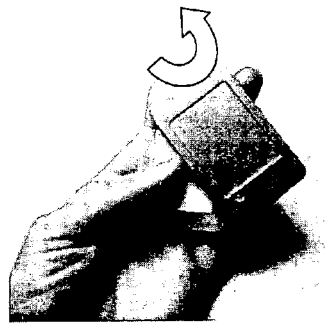
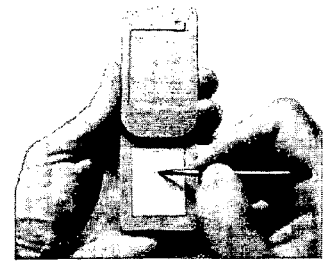
Figure 3a
Figure 3b

DEVICES AND ASSOCIATED HINGE MECHANISMS

RELATED APPLICATION

This application was originally filed as and claims priority to PCT Application No. PCT/EP2006/010940 on Nov. 14, 2006.

TECHNICAL FIELD

The present invention relates to devices, and also hinge mechanisms for devices. In particular, the present invention relates to handheld electronic devices (which may or may not be handheld in use) and hinge mechanisms for such devices. The devices may or may not comprise radiotelephone functionality.

BACKGROUND

The surface area available on electronic devices decreases as electronic devices (e.g. radiotelephones) get smaller and smaller. This can lead to a compromised ergonomic arrangement and thus awkward usability of the user interface (UI) area, for example, the keypad/touchpad.

In some products, it may be beneficial to have other UI elements other than just a single key input. This is particularly so for the case of graphical text input (e.g. Chinese/Japanese/Korean text input) or dedicated keys used only for one or more operational modes (e.g. music or video playing or making a telephone call) of the device.

Consumers are also often encouraged to purchase products with imaginative device arrangements in which features of the device can be hidden away and subsequently revealed when required.

The listing or discussion of a prior-published document in this specification should not necessarily be taken as an acknowledgement that the document is part of the state of the art or is common general knowledge.

SUMMARY

According to a first aspect, the present invention provides a mechanism for providing a swivel hinge in a device, the mechanism comprising first and second parts arranged to swivel about a swivel axis, wherein the mechanism is arranged such that relative turning of the first and second parts about the swivel axis in a first direction reveals a first device user operational area, and relative turning of the first and second parts in the second opposing direction reveals a second device user operational area.

The mechanism may comprise a third part, the third part arranged to latch onto the second part in the first swivel direction, and arranged to latch onto the first part in the second swivel direction.

The mechanism may be arranged to provide a device closed configuration, and first and second device open configurations, the first device open configuration being provided by relative turning of the first and second parts in the first direction from the device closed configuration, and the second device open configuration being provided by relative turning of the first and second in the second direction from the device closed configuration, and wherein both the first and second device user operational areas are hidden in the closed configuration, and the first device user operational area is revealed in the first open configuration, and the second device user operational area is revealed in the second open configuration.

The first and second device user operational areas may be arranged to provide user input areas. The first device user operational area may be arranged to provide a user key input area. The second device user operational area may be arranged to provide a user scribe recognition area.

The clockwise turning about the swivel axis may be arranged to reveal a user key input first device user operational area, and anticlockwise turning may be arranged to reveal a user scribe recognition second device user operational area.

The second (or first) device user operational area may be arranged to be dedicated for use in one particular device operational mode and not useable in other device functional modes. Thus, user input areas which control, for example, the capturing of images or the playing of audio may only be available to provide those functions in certain configurations.

A device comprising the hinge arrangement described previously is also within the scope of the present invention.

According to a second aspect, the present invention provides a device comprising first and second housings arranged to swivel about a swivel axis, wherein the device is arranged such that relative turning of the first and second housings about the swivel axis in a first direction reveals a first device user operational area, and relative turning of the first and second housings in the second opposing direction reveals a second device user operational area.

The device may be arranged to provide a device closed configuration, and first and second device open configurations, the first device open configuration being provided by relative turning of the first and second housings in the first direction from the device closed configuration, and the second device open configuration being provided by relative turning of the first and second housings in the second direction from the device closed configuration, and wherein both the first and second device user operational areas are hidden in the closed configuration, and the first device user operational area is revealed in the first open configuration, and the second device user operational area is revealed in the second open configuration.

The first housing may be arranged to overlie the second housing in the closed configuration.

The first and second device user operational areas may be arranged to provide user input areas. The first device user operational area may be arranged to provide a user key input area. The second device user operational area may be arranged to provide a user scribe recognition area.

The device may comprise a housing located intermediate to the first and second housings, and wherein the intermediate housing comprises the first device user operational area, and the second housing comprises the second device user operational area.

The device may comprise a housing located intermediate to the first and second housings, and wherein the intermediate housing comprises the first device user operational area, and the second housing comprises the second device user operational area, and wherein the intermediate housing is arranged to latch onto the second housing in the first swivel direction, and arranged to latch onto the first housing in the second swivel direction.

The device may comprise a housing located intermediate to the first and second housings, and wherein the intermediate housing comprises the first device user operational area, and the second housing comprises the second device user operational area, and wherein the device is arranged such that the intermediate housing overlies the second housing in the first open configuration and is maintained below the first housing during movement into the second open configuration.

The device may comprise a housing located intermediate to the first and second housings, and wherein the intermediate housing comprises the first device user operational area, and the second housing comprises the second device user operational area, and wherein the device is arranged such that the intermediate housing overlies the second housing in the first open configuration and is displaced to reveal the second device user operational area in the second open configuration.

The device may comprise a housing located intermediate to the first and second housings, and wherein the intermediate housing comprises the first device user operational area, and the second housing comprises the second device user operational area, and wherein the first and second device user operational areas are arranged such that user actuation of the first device user operational area is electronically registered on the second device user operational area in the first open configuration to provide signalling for user input from the first device operational area.

The device may be arranged to detect the configuration of the device, and upon detection of the first open configuration, the second user operational area is arranged to register user input from the first device user operational area to provide signalling for user input from the first device operational area, and upon detection of the second open configuration, the second user operational area is arranged to detect user scribing.

Clockwise turning about the swivel axis of the device may be arranged to reveal a user key input first device user operational area, and anticlockwise turning may be arranged to reveal a user scribe recognition second device user operational area.

The second (or first) device user operational area may be dedicated for use in one particular device operational mode and not useable in other device functional modes.

The first housing may comprise an electronic display on a user facing surface of the housing in a plane perpendicular to the swivel axis.

The first and second open configurations may be provided when the first and second device housings have been relatively turned about the swivel axis by 180 degrees.

The first housing may comprise an electronic display on a user facing surface of the housing in a plane perpendicular to the swivel axis, and the device may be arranged to display items for display in a first orientation in the closed configuration, and arranged to display items in a rotated orientation in the first and second open configurations to provide items for display in the correct orientation for use by a user of the device in the device configurations.

The first and second open configurations may be provided when the first and second device housings have been relatively turned about the swivel axis by 180 degrees, and the orientation of the items on the display in the first or second open configuration is 180 degrees to the orientation of items on the display in the closed configuration.

The swivel axis may be located towards the top of the device when the device is held in a use state by a user. In other embodiments, it may be located towards the bottom or the middle of the device.

The present invention also provides a handheld electronic device.

According to a third aspect, the present invention provides a computer program for detecting the configuration of a device, the device comprising first and second housings arranged to swivel about a swivel axis, wherein the device is arranged such that relative turning of the first and second housings about the swivel axis in a first direction reveals a first device user operational area, and relative turning of the first and second housings in the second opposing direction reveals a second device user operational area, and wherein the device is arranged to provide a device closed configuration, and first and second device open configurations, the first device open configuration being provided by relative turning of the first and second housings in the first direction from the device closed configuration, and the second device open configuration being provided by relative turning of the first and second housings in the second direction from the device closed configuration, and wherein both the first and second device user operational areas are hidden in the closed configuration, and the first device user operational area is revealed in the first open configuration, and the second device user operational area is revealed in the second open configuration, and wherein the computer program is arranged to provide signalling according to the device configuration detected.

The computer program may be arranged to provide signalling to correctly orientate items for display, on a display located on a user facing surface of the first device housing, according to the configuration of the device.

The computer program may be arranged to provide signalling to control the function provided by the second device user operable area according to the configuration of the device.

The computer program may be arranged to detect registration of user input received at the first device user operable area by the second device user operable area in the first open configuration.

The invention provides a carrier for the computer program of the third aspect. The computer program may form part of a distributed computing system, in which different elements of the computer program are stored or run (or both) on different parts of the distributed computing system.

According to a fourth aspect, the present invention provides an apparatus for detecting the configuration of a device, the device comprising first and second housings arranged to swivel about a swivel axis, wherein the device is arranged such that relative turning of the first and second housings about the swivel axis in a first direction reveals a first device user operational area, and relative turning of the first and second housings in the second opposing direction reveals a second device user operational area, and wherein the device is arranged to provide a device closed configuration, and first and second device open configurations, the first device open configuration being provided by relative turning of the first and second housings in the first direction from the device closed configuration, and the second device open configuration being provided by relative turning of the first and second housings in the second direction from the device closed configuration, and wherein both the first and second device user operational areas are hidden in the closed configuration, and the first device user operational area is revealed in the first open configuration, and the second device user operational area is revealed in the second open configuration, the apparatus arranged to comprise circuitry to detect the device configuration and provide signalling according to the detected device configuration.

The apparatus may be arranged to provide signalling to correctly orientate items for display, on a display located on a user facing surface of the first device housing, according to the configuration of the device.

The apparatus may be arranged to provide signalling to control the function provided by the second device user operable area according to the configuration of the device.

The apparatus may be arranged to provide signalling based upon registration of user input received at the first device user operable area by the second device user operable area in the first open configuration.

The present invention provides a means for acting as a swivel hinge for a device, the means comprising first and second means arranged to swivel about a swivel axis, wherein the means is arranged such that relative turning of the first and second means about the swivel axis in a first direction reveals a first means for device user operation, and relative turning of the first and second means in the second opposing direction reveals a second means for device user operation.

The present invention provides a device comprising first and second means for housing arranged to swivel about a swivel axis, wherein the device is arranged such that relative turning of the first and second means for housing about the swivel axis in a first direction reveals a first means for device user operation, and relative turning of the first and second means for housing in the second opposing direction reveals a second means for device user operation.

The present invention provides an apparatus for detecting the configuration of a device, the device comprising first and second means for housing arranged to swivel about a swivel axis, wherein the device is arranged such that relative turning of the first and second means for housing about the swivel axis in a first direction reveals a first means for device user operation, and relative turning of the first and second means for housing in the second opposing direction reveals a second means for device user operation, and wherein the device is arranged to provide a device closed configuration, and first and second device open configurations, the first device open configuration being provided by relative turning of the first and second means for housing in the first direction from the device closed configuration, and the second device open configuration being provided by relative turning of the first and second means for housing in the second direction from the device closed configuration, and wherein both the first and second means for device user operation are hidden in the closed configuration, and the first means for device user operation is revealed in the first open configuration, and the second means for device user operation is revealed in the second open configuration, the apparatus arranged to comprise circuitry to detect the device configuration and provide signalling according to the detected device configuration.

According to a fifth aspect, the present invention provides a method for detecting the configuration of a device, the device comprising first and second housings arranged to swivel about a swivel axis, wherein the device is arranged such that relative turning of the first and second housings about the swivel axis in a first direction reveals a first device user operational area, and relative turning of the first and second housings in the second opposing direction reveals a second device user operational area, and wherein the device is arranged to provide a device closed configuration, and first and second device open configurations, the first device open configuration being provided by relative turning of the first and second housings in the first direction from the device closed configuration, and the second device open configuration being provided by relative turning of the first and second housings in the second direction from the device closed configuration, and wherein both the first and second device user operational areas are hidden in the closed configuration, and the first device user operational area is revealed in the first open configuration, and the second device user operational area is revealed in the second open configuration, wherein the method provides signalling according to the device configuration detected.

Any circuitry may include one or more processors, memories and bus lines. One or more of the circuitries described may share circuitry elements.

The present invention includes one or more aspects, embodiments and/or features of said aspects and/or embodiments in isolation and/or in various combinations whether or not specifically stated (including claimed) in that combination or in isolation.

Certain embodiments of the invention propose a new way to double the area that can be used for input on a swivel device, thus allowing for a richer physical UI.

BRIEF DESCRIPTION OF THE DRAWINGS

A description is now given, by way of example only, with reference to the accompanying drawings, in which:—

FIGS. 2a and 2b show opening of a device in a first direction according to one embodiment of the present invention;

FIGS. 3a and 3b show opening of a device in a second direction according to one embodiment of the present invention.

DETAILED DESCRIPTION

Figure 1:
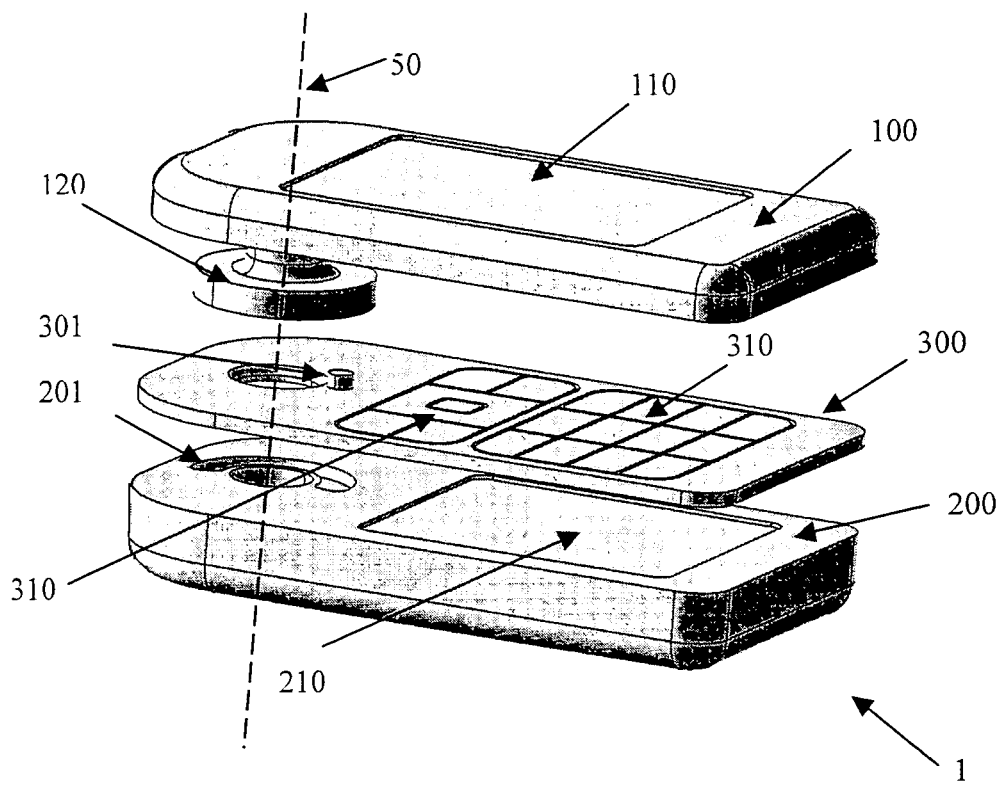
FIG. 1 is an illustration of one embodiment of the present invention.

Exterior assembly components of one embodiment of a device according to the present invention is shown in FIG. 1. In the embodiment shown, the device 1 is a radiotelephone comprising a first housing 100, a second housing 200, and a third intermediate housing 300. Each of the housings 100, 200, 300 have approximately the same sized (and shaped) in-use user facing surface, although they are of varying thicknesses.

Each of the in-use user facing surfaces of the housings comprise user interface elements. The first housing 100 comprises a display 110, the second housing 200 a touch input pad 210 (a user operable area), and the third intermediate housing 300 a user input keypad 310 (a user operable area).

When assembled together in the arrangement of FIG. 1, the first housing 100 and second housing 200 sandwich the intermediate housing 300. This provides a closed configuration of the device 1. The display 110 (or some other user interface element located on the in-use user facing surface of the housing 100, or on some other housing surface) may be configured to allow operation of the device 1 in the closed configuration. This may, for example, allow the answering of calls when the device is in the closed configuration.

The housings 100, 200, 300 are assembled together so that they can be swivelled relative to one another around a swivel axis 50, which is perpendicular to the in-use user facing surfaces of the housings. In this embodiment, the swivel axis 50 is located at a central position towards the top of the device 1. Movement about the swivel axis 50 provides various device configurations, as will be explained later with reference to FIGS. 2 and 3.

The keypad 310 comprises a number of discrete user input areas, a first user input area located towards the base of the device 1 allowing the input of alphanumeric characters, and a second area located towards the top of the device 1 allowing "soft" key control (function depending on position in user interface menu) of device operations. Each of the areas 310 comprise specific key regions which are separately actuable e.g. a specific key region for actuation of the number 1, and a specific key region for the actuation of the number 2.

In this embodiment, the housing 300 is a thin plastic element in which key regions do not comprise electronic components to detect user actuation. Instead, each of the key regions is actuable to at least partially move in the plane of the swivel axis to make contact with the touchpad area 210 underneath. Thus, the touchpad area 210 detects/registers the user actuation of the key regions of the keypad 310. In this embodiment, the touch input pad 210 is arranged to be at least as large as the keypad 310 which overlies the touchpad 210 in the closed configuration. In this way, user actuation of the keypad 310 can be detected by the touchpad 210.

The housing 300 comprises a latch element 301 located at a position proximal to the swivel axis on the in-use user facing surface of the housing 300. A further latch element (302 not shown) is located on the in-use non-user facing surface of the housing 300 at a position directly underneath the latch element 301. The latch elements are dimensioned to run in tracks (201, 101) as will be described below.

An arced track 201 is located around the swivel axis 50 on the in-use user facing surface of the second housing 200 to receive the latch element 302 (not shown) located on the in-use non-user facing surface of the housing 300 at a position directly underneath the latch element 301.

A corresponding arc tracked (101 not shown) is also provided on the in-use non-user facing surface of the first housing 100, in a position facing the track 201. In the embodiment of FIG. 1, this track 101 (not shown) is located on the underside of a swivel hinge element 120, which is located on the in-use non-user facing surface of first housing 100. The hinge element 120 does not rotate relative to the housing 100, but is fixed to the housing 100.

It will be appreciated that each of the tracks have track ends which each define stop positions, inhibiting further movement of the latch elements in the tracks. This is further explained below.

When assembled together, the latch elements 301, 302 sit in the respective tracks 101, 201. In use, turning the first housing in a clockwise direction (FIG. 2a, 2b) with respect to the second housing 200 (from the closed configuration of FIG. 1) allows the housing 100 to be rotated away to reveal from the third housing 300. The second housing 200 is not revealed.

This is because latch element 301 is arranged to move along the track 101 from one track end to the other track end during this clockwise movement. At the same time, the latch element 302 is not able to move in track 201 as it has reached the end of the track. In this way, the third intermediate housing 300 remains to overlie the second housing 200. Accordingly, the keypad 310 is progressively revealed. When the latch element 301 hits the other track end, the device 1 is at a first fully open configuration (FIG. 2b).

In contrast, when the first housing 100 is turned relative to the second housing 200 in an anti-clockwise direction (FIG. 3a, 3b), the latch element 201 is unable to move in track 101 as it had reached the end of the track. At the same time, the latch element 302 is able to move along the track 201 from one track end to the other track end. In this way, the intermediate housing 300 moves with the first housing 100 to reveal the second housing. Accordingly, the touchpad 210 is revealed. When the latch element 302 hits the other end of the track 201, the device 1 is at a second fully open configuration.

It will be appreciated that the hinge mechanism described above may be integral with the device housings 100, 200, 300 or be separate parts which are subsequently attached to the device housings.

The function provided by the touchpad 210 changes according to the configuration of the device 1. In the first fully open configuration, the touchpad 210 registers user actuation of the keypad 310 (as explained previously). In the second full open configuration, the touchpad acts to be able to detect user scribing (writing/drawing) with or without (e.g. using a finger) a stylus pen. Such a configuration would be particularly useful when inputting graphical Chinese text for example.

In the case of Chinese input, if user has the phone in the right hand, the natural opening direction of a swivel phone is clockwise (for a right handed user). This action will reveal the keypad 310, which will allow the user to make phonecalls or write messages using the pin-yin input system. If the user wants to write a message using a pen and Chinese character recognition, the user will hold the phone in the left hand. The natural opening direction in the left hand is counter-clockwise, which will reveal a touch screen 210 which can be used to write the message.

Figure 5:
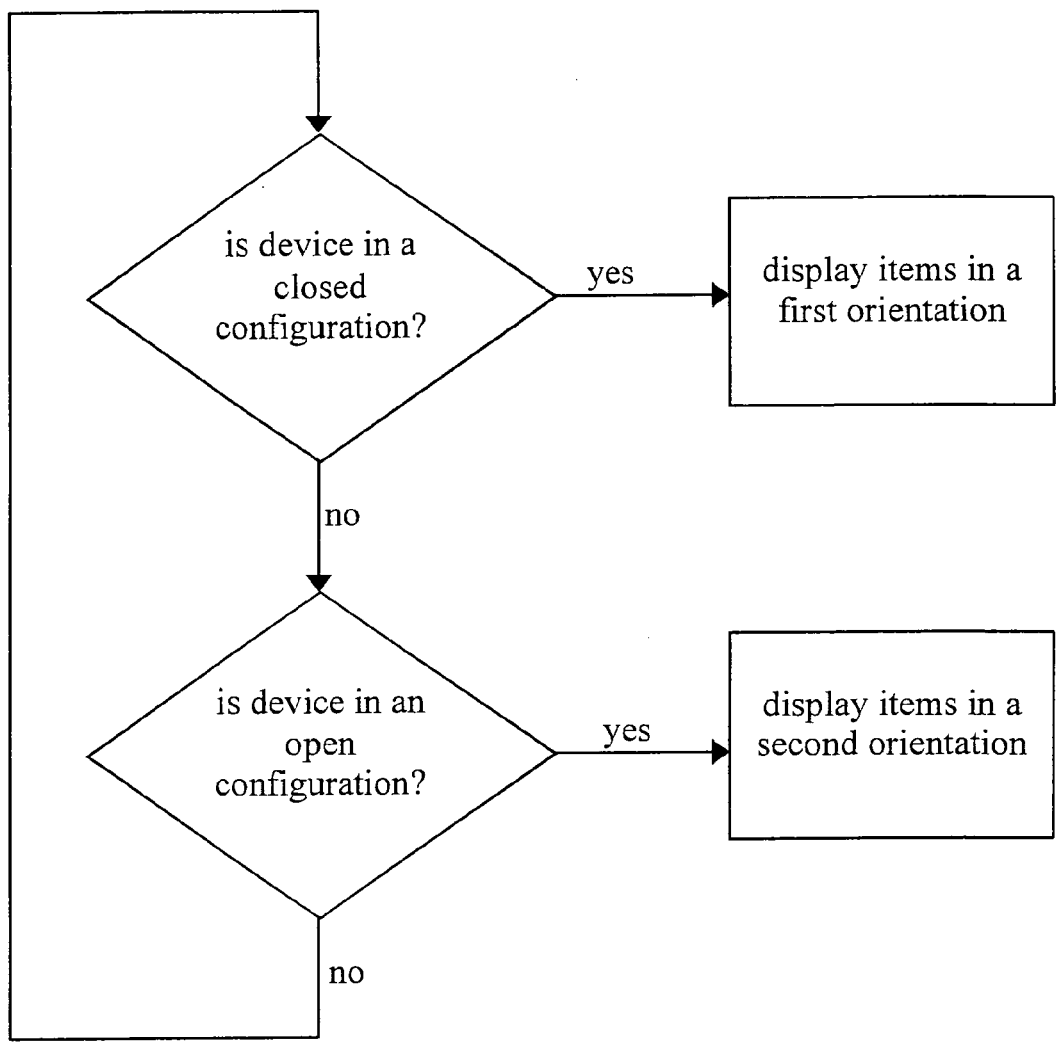
FIG. 5 is a method according to one embodiment of the present invention.

The orientation of the output on the display 110 can also be changed according to the device configuration (FIG. 5). In either of the fully open configurations, the items on the display can be arranged to be rotated by 180 degrees to items displayed on the display 110 in the closed configuration. Such display items can include, for example, battery power level and/or radiotelephone signal strength.

Figure 4:
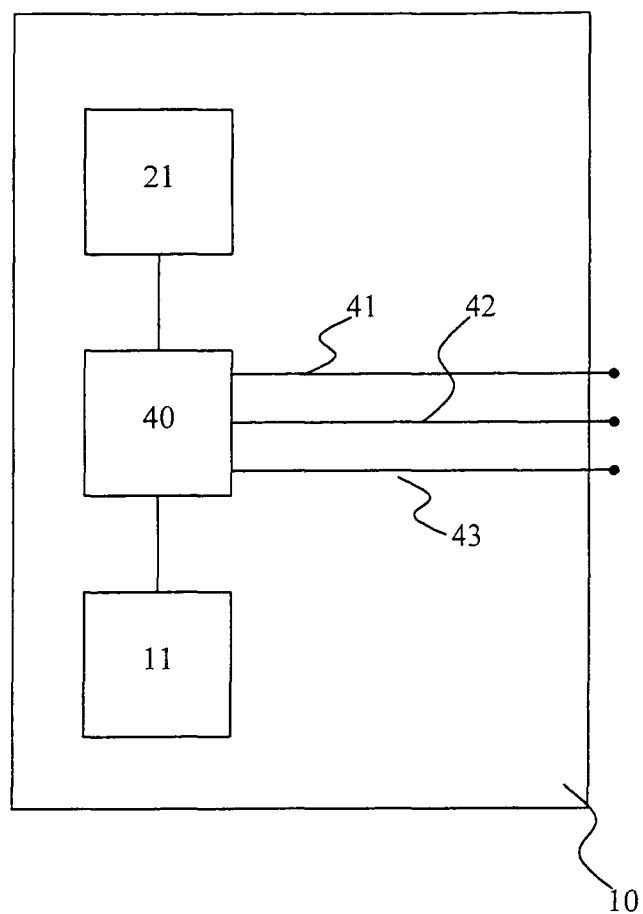
FIG. 4 is a schematic illustration of an apparatus according to one embodiment of the present invention.

The detection of device configuration can be provided by appropriately arranged switches and circuitry. For example, see the apparatus 10 of FIG. 4 in which bus lines 41, 42, 43 from switches (not shown) provide information to a processor 40 about the current device configuration (41 indicating closed configuration, 42 indicating first fully open configuration and 43 indicating second fully open configuration). According to the signalling received, the processor 40 provides signalling to the display processor 21 and the touchpad processor 11. Accordingly, the display processor 21 orientates the display to the required orientation, and the touchpad processor 11 changes the mode of the touchpad 210 from registering user input from the keypad 310 to registering scribe input directly onto the touchpad 210.

Either the first or second user operable areas 310, 210 may provide one or more dedicated keys which are revealed to control a particular function of the device. For example, these could be play, forward/rewind, pause, record functions which are used to capture/play still/moving images and/or play audio (including music).

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A mechanism for providing a swivel hinge in a device, the mechanism comprising:
    first and second parts arranged to swivel about a single swivel axis,
    wherein relative turning of the first and second parts about the swivel axis in a first swivel direction reveals a first device user operational area, and relative turning of the first and second parts in a second opposing swivel direction reveals a second device user operational area, and
    wherein the swivel axis is located at a central position and is perpendicular to the first device user operational area and the second device user operational area,
    wherein the mechanism is arranged to provide a device closed configuration, and first and second device open configurations, the first device open configuration being provided by relative turning of the first and second parts in the first swivel direction from the device closed configuration, and the second device open configuration being provided by relative turning of the first and second parts in the second opposing swivel direction from the device closed configuration, and wherein both the first and second device user operational areas are hidden in the closed configuration, and the first device user operational area is revealed in the first open configuration, and the second device user operational area is revealed in the second open configuration,
    wherein the first and second device user operational areas are arranged to provide user input areas, and
    wherein at least one of clockwise and anticlockwise turning about the swivel axis is arranged to reveal a user key input first device user operational area, and the other of the at least one of clockwise and anticlockwise turning is arranged to reveal a user scribe recognition second device user operational area.

2. The mechanism according to claim 1, comprising a third part, the third part arranged to latch onto the second part in the first swivel direction, and arranged to latch onto the first part in the second swivel direction.

3. The mechanism according to claim 1, wherein the first device user operational area is arranged to provide a user key input area.

4. The mechanism according to claim 1, wherein the second device user operational area is arranged to provide a user scribe recognition area.

5. The mechanism according to claim 1, wherein the second device user operational area is arranged to be dedicated for use in one particular device operational mode and not useable in other device functional modes.

6. A portable electronic device comprising the mechanism of claim 1.

7. A device, comprising:
    first and second housings arranged to swivel about a single swivel axis,
    wherein the device is arranged such that relative turning of the first and second housings about the swivel axis in a first direction reveals a first device user operational area, and relative turning of the first and second housings in the second opposing direction reveals a second device user operational area,
    wherein the swivel axis is located at a central position and is perpendicular to the first device user operational area and the second device user operational area,
    wherein the device is arranged to provide a device closed configuration, and first and second device open configurations, the first device open configuration being provided by relative turning of the first and second housings in the first direction from the device closed configuration, and the second device open configuration being provided by relative turning of the first and second housings in the second direction from the device closed configuration, and wherein both the first and second device user operational areas are hidden in the closed configuration, and the first device user operational area is revealed in the first open configuration, and the second device user operational area is revealed in the second open configuration, and
    wherein the first housing comprises an electronic display on a user facing surface of the housing in a plane perpendicular to the swivel axis.

8. The device according to claim 7, wherein the first and second device user operational areas are arranged to provide user input areas.

9. The device according to claim 7, wherein the first device user operational area is arranged to provide a user key input area.

10. The device according to claim 7, wherein the second device user operational area is arranged to provide a user scribe recognition area.

11. The device according to claim 7, wherein the device comprises a housing located intermediate to the first and second housings, and wherein the intermediate housing comprises the first device user operational area, and the second housing comprises the second device user operational area.

12. The device according to claim 7, wherein the device comprises a housing located intermediate to the first and second housings, and wherein the intermediate housing comprises the first device user operational area, and the second housing comprises the second device user operational area, and wherein the device is arranged such that the intermediate housing overlies the second housing in the first open configuration and is maintained below the first housing during movement into the second open configuration.

13. The device according to claim 7, wherein the device is arranged to detect the configuration of the device, and upon detection of the first open configuration, the second user operational area is arranged to register user input from the first device user operational area to provide signalling for user input from the first device operational area, and upon detection of the second open configuration, the second user operational area is arranged to detect user scribing.

14. A non-transitory computer program product for detecting the configuration of a device, the device comprising:
   first and second housings arranged to swivel about a single swivel axis,
   wherein the device is arranged such that relative turning of the first and second housings about the swivel axis in a first direction reveals a first device user operational area, and relative turning of the first and second housings in a second opposing direction reveals a second device user operational area, and
   wherein the device is arranged to provide a device closed configuration, and first and second device open configurations, the first device open configuration being provided by relative turning of the first and second housings in the first direction from the device closed configuration, and the second device open configuration being provided by relative turning of the first and second housings in the second opposing direction from the device closed configuration, and
   wherein both the first and second device user operational areas are hidden in the closed configuration, and the first device user operational area is revealed in the first open configuration, and the second device user operational area is revealed in the second open configuration, and
   wherein the swivel axis is located at a central position and is perpendicular to the first device user operational area and the second device user operational area, and
   wherein the computer program is arranged to provide signaling according to the device configuration detected,
   wherein the computer program product is arranged to provide signaling to correctly orientate items for display, on a display located on a user facing surface of the first device housing, according to the configuration of the device.

15. Apparatus for detecting the configuration of a device, the device comprising:
   first and second housings arranged to swivel about a single swivel axis,
   wherein the device is arranged such that relative turning of the first and second housings about the swivel axis in a first direction reveals a first device user operational area, and relative turning of the first and second housings in a second opposing direction reveals a second device user operational area, and
   wherein the device is arranged to provide a device closed configuration, and first and second device open configurations, the first device open configuration being provided by relative turning of the first and second housings in the first direction from the device closed configuration, and the second device open configuration being provided by relative turning of the first and second housings in the second opposing direction from the device closed configuration, and
   wherein both the first and second device user operational areas are hidden in the closed configuration, and the first device user operational area is revealed in the first open configuration, and the second device user operational area is revealed in the second open configuration,
   wherein the swivel axis is located at a central position and is perpendicular to the first device user operational area and the second device user operational area, and
   the apparatus arranged to comprise circuitry to detect the device configuration and provide signaling according to the detected device configuration,
   wherein the circuitry is arranged to provide signaling to correctly orientate items for display, on a display located on a user facing surface of the first device housing, according to the configuration of the device.

* * * * *